United States Patent
Cao et al.

(10) Patent No.: US 7,876,755 B2
(45) Date of Patent: Jan. 25, 2011

(54) METHOD AND SYSTEM FOR IMPROVING QUALITY OF COMMUNICATION BASED ON LABEL DISTRIBUTION PROTOCOL

(75) Inventors: Wei Cao, Shenzhen (CN); Xiaohu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 12/212,300

(22) Filed: Sep. 17, 2008

(65) Prior Publication Data

US 2009/0028148 A1 Jan. 29, 2009

Related U.S. Application Data

(63) Continuation of application No. PCT/CN2007/000364, filed on Feb. 2, 2007.

(30) Foreign Application Priority Data

Mar. 20, 2006 (CN) .................... 2006 1 0064983

(51) Int. Cl.
*H04L 12/28* (2006.01)
*H04L 12/56* (2006.01)
(52) U.S. Cl. ..................................... 370/390
(58) Field of Classification Search ............. 370/390, 370/389, 395, 331, 227, 351, 408, 238, 392, 370/461, 235, 338, 252–254; 709/238, 242, 709/239, 224; 455/436, 525, 432, 522, 435
See application file for complete search history.

(56) References Cited

U.S. PATENT DOCUMENTS 6,374,303 B1 * 4/2002 Armitage et al. ............ 709/242

6,643,279 B1 * 11/2003 Li et al. ...................... 370/331

(Continued)

FOREIGN PATENT DOCUMENTS

EP 1515495 3/2005

(Continued)

OTHER PUBLICATIONS

International Search Report for International Application No. PCT/CN2007/000364, dated Apr. 20, 2007, with English translation.

(Continued)

*Primary Examiner*—Pankaj Kumar
*Assistant Examiner*—Prenell P Jones
(74) *Attorney, Agent, or Firm*—Harness, Dickey & Pierce, P.L.C.

(57) ABSTRACT

A method and system for improving a quality of communication based on a label distribution protocol is provided. The method includes the following: When a local label switching router (LSR) finds out a change of a route at an upstream node in a multicast label switching path (LSP), it calculates and sets up a new optimized multicast LSP according to the label distribution protocol (LDP), and delays to send a withdraw request to the upstream node in the former multicast LSP. An interruption of the data stream in the multicast LSP reconstruction procedures can be avoided or reduced, so that the loss of data packets caused by the multicast LSP adjustment is reduced, and the quality of communication of the multicast is improved.

5 Claims, 5 Drawing Sheets

U.S. PATENT DOCUMENTS 6,895,441 B1 * 5/2005 Shabtay et al. .............. 709/238
2004/0218536 A1 11/2004 Yasukawa et al.

FOREIGN PATENT DOCUMENTS

JP 2005072906 3/2005

OTHER PUBLICATIONS

Label Distribution Protocol Extensions for Point-to-Multipoint and Multipoint-to-Multipoint Label Switched Paths, Cisco Systems, Inc., Feb. 26, 2006.
Supplementary European Search Report regarding International Application No. EP07702256 dated Aug. 21, 2009.
Multicast Extensions for LDP dated Mar. 2005, Network Working Group, Internet Draft.
Native IP Multicast Support in MPLS, Arup Acharya and Frederic Griffoul.
Support of LDP Multicast Label Switched Paths over Point-to-Multipoint Label Switched Path Tunnels and on Multi-Access Links, Oct. 2005, Internet Draft.
Overview of IP Multicast in a Multi-Protocol Label Switching (MPLS) Environment. Ooms et al. Aug. 2002.
LDP Specification. Andersson et al. Jan. 2001.
Multiprotocol Label Switching Architecture. Rosen et al. Jan. 2001.
Label Distribution Protocol Extensions for Point-to-Multipoint and Multipoint-to-Multipoint Label Switched Paths. Minei et al. Oct. 2005.
First Chinese Office Action regarding Application No. 200610064983.0. Mailed Jul. 24, 2009. Translation provied by Huawei Technologies Co., Ltd.
First European Office Action regarding Application No. 07 702 256. 4-1249. Dated Sep. 29, 2009.
Written Opinion of the International Searching Authority. Mailed May 17, 2007. Translation provided by Huawei Technologies Co., Ltd.

* cited by examiner

METHOD AND SYSTEM FOR IMPROVING QUALITY OF COMMUNICATION BASED ON LABEL DISTRIBUTION PROTOCOL

CROSS-REFERENCE TO RELATED APPLICATIONS

This application is a continuation of International Application No. PCT/CN2007/000364, filed on Feb. 2, 2007. This application claims the benefit of Chinese Application No. 200610064983.0, filed on Mar. 20, 2006. The disclosures of each of the above applications are incorporated herein by reference in their entirety.

FIELD

The present disclosure relates to a communication field, and more particularly to setting up a communication path.

BACKGROUND

The statements in this section merely provide background information related to the present disclosure and may not constitute prior art.

Multicast technology is a one-to-many multiparty communication technology. Being different from a commonly used unicast technology, the multicast technology reduces the replication of data content by setting up an optimized multicast forwarding path, thereby greatly reducing the network resources occupied in the multiparty communication.

Currently, multiple protocol label switch (MPLS) technology is a routing technology widely applied to the IP network, in which a label distribution protocol (LDP), a protocol for distributing labels among routers adopting the MPLS protocol, is often adopted in terms of label distribution. In the past, the MPLS is usually adapted to forward unicast IP packets. With the development of the multicast technology, it gradually becomes a researching focus to realize multicast through the MPLS technology. Recently, it has become an important development direction for the existing MPLS multicast to set up a point-to-multipoint (P2MP) label switching path (LSP) tunnel and a multipoint-to-multipoint (MP2MP) LSP tunnel through the LDP technology.

In the related art, the forwarding paths P2MP LSP and MP2MP LSP are set up through the LDP technology.

The P2MP LSP is set up according to a unicast routing protocol, and usually follows an optimized path principle. When the route is changed due to a certain reason, the LDP needs to determine a new optimized multicast LSP according to a route changing protocol, then sends a mapping request to a new upstream node, and sends a withdraw message to the former upstream node (which was the optimized one in the past but not the optimized one now). After such an adjustment, the multicast LSP becomes the optimized multicast LSP again. The method for adjusting the upstream node when the P2MP LSP forwarding path is set up is the same as that for adjusting the upstream node when the MP2MP forwarding path is set up. The P2MP is taken as an example herein, and the processing procedures thereof are shown in FIG. 1.

At first, in the P2MP LSP, a packet is forwarded from node R1 to R4 through R2, from R4 to R5 and R6, and from R6 to R7.

When the above route is changed due to a certain reason, by means of calculating according to the LDP protocol, the node R4 finds out that the upstream node R2 thereof is no longer in the optimized route, and the node R3 becomes the upstream node in the optimized route. At this time, the node R4 sends a mapping message to the node R3, and sends a withdraw message to the node R2.

Then, intermediate procedures for reconstructing the LSP are described. After receiving the mapping message, the node R3 continues to send the mapping request to the former upstream node R1 thereof. After receiving the withdraw request, the node R2 withdraws the label binding with the node R4, and at the same time, continues to send the withdraw request to the upstream node R1 since it does not have any downstream node.

It can be known from the related art that, in the path adjustment procedures, it is possible that the former multicast LSP has already been withdrawn before the setting up of the new multicast LSP is finished. The data stream forwarding may be temporarily interrupted, and it may not be resumed until the setting up of the new multicast LSP is finished. Moreover, the common multicast communication does not have a retransmission mechanism, so the resulted losing of packets may seriously influence the quality of the multicast service.

SUMMARY

This section provides a general summary of the disclosure, and is not a comprehensive disclosure of its full scope or all of its features.

In an embodiment, the disclosure is directed to a method and a system for improving the quality of communication based on a label distribution protocol, which are suitable for avoiding or reducing an interruption of a data stream in multicast LSP reconstruction procedures, so that losing of data packets caused by the multicast LSP adjustment can be reduced greatly.

The embodiments of the disclosure are realized through the following technical solutions.

An embodiment of the disclosure provides a method for improving the quality of communication based on a label distribution protocol, which includes the following processes.

A label switching router (LSR) calculates and sets up a new optimized multicast label switching path (LSP) according to the label distribution protocol (LDP) and delays to send a withdraw request to an upstream node in a former multicast LSP, when the LSR finds out a change of the upstream node in the multicast LSP.

An embodiment of the disclosure provides a system for improving the quality of communication based on a label distribution protocol, which includes a label switching router (LSR), and the LSR includes a triggering unit and a delay control unit.

The triggering unit is adapted to trigger an LSR node to send a mapping request to an upstream node in a new optimized label switching path (LSP), and send a withdraw request to an upstream node in a former multicast LSP.

The delay control unit is adapted to control the triggering unit to send the withdraw request to the upstream node in the former multicast LSP.

It can be known from the technical solutions that, in the embodiments of the disclosure, when the local LSR finds out the change of the route at the upstream node in the multicast LSP, it calculates and sets up the new optimized multicast LSP route according to the LDP, and delays to send the withdraw request to the upstream node in the former multicast LSP. Through the embodiment of the disclosure, the interruption of the data stream in the multicast LSP reconstruction procedures can be avoided or reduced, so that the losing of data packets caused by the multicast LSP adjustment is reduced greatly, and the quality of communication of the multicast is improved.

Further areas of applicability will become apparent from the description provided herein. The description and specific examples in this summary are intended for purposes of illustration only and are not intended to limit the scope of the present disclosure.

DRAWINGS

The disclosure will become more fully understood from the detailed description given herein below for illustration only, and thus is not limitative of the disclosure, and wherein.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The following description is merely exemplary in nature and is not intended to limit the present disclosure, application, or uses.

Various embodiments of the disclosure provide a method for improving the quality of communication based on a label distribution protocol. In an embodiment of the disclosure, when an LSR in a multicast LSP, or called a local LSR, finds out a change of a route at an upstream node due to a certain reason, it does not immediately send a withdraw message to an upstream node in a former multicast LSP, but delay to send the withdraw message and/or send the withdraw message by a data stream triggering mode in order to avoid or reduce the interruption time of the data stream, thereby reducing the losing of packets.

Figure 1:
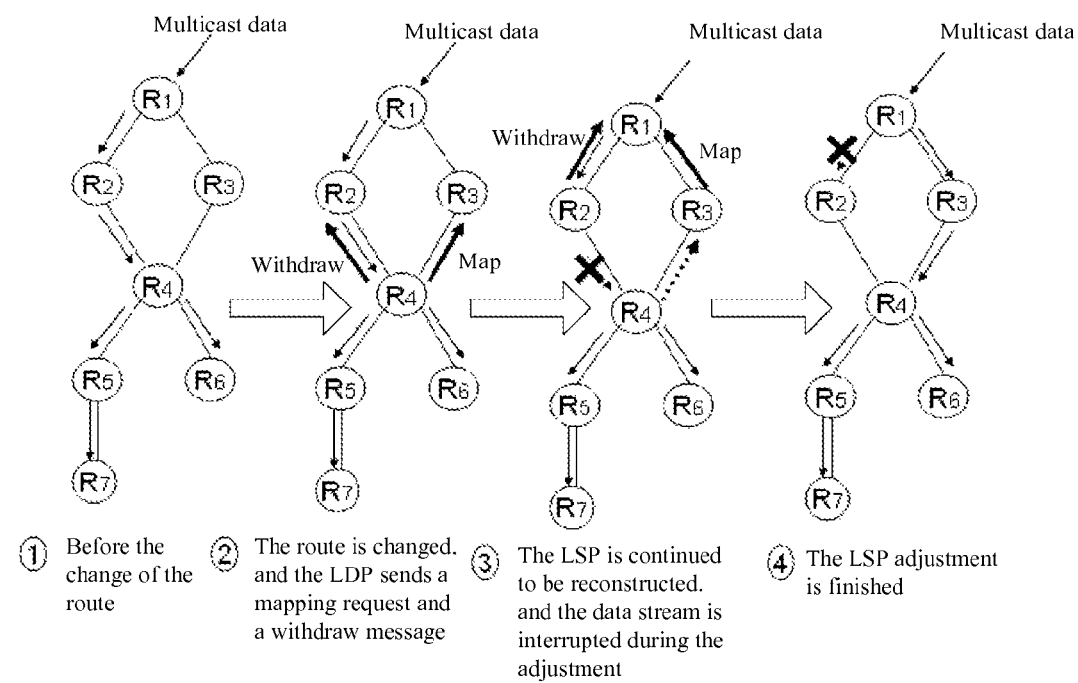
FIG. 1 is a processing flow chart of an LSP after a path of an upstream node is changed in the related art.
Figure 2:
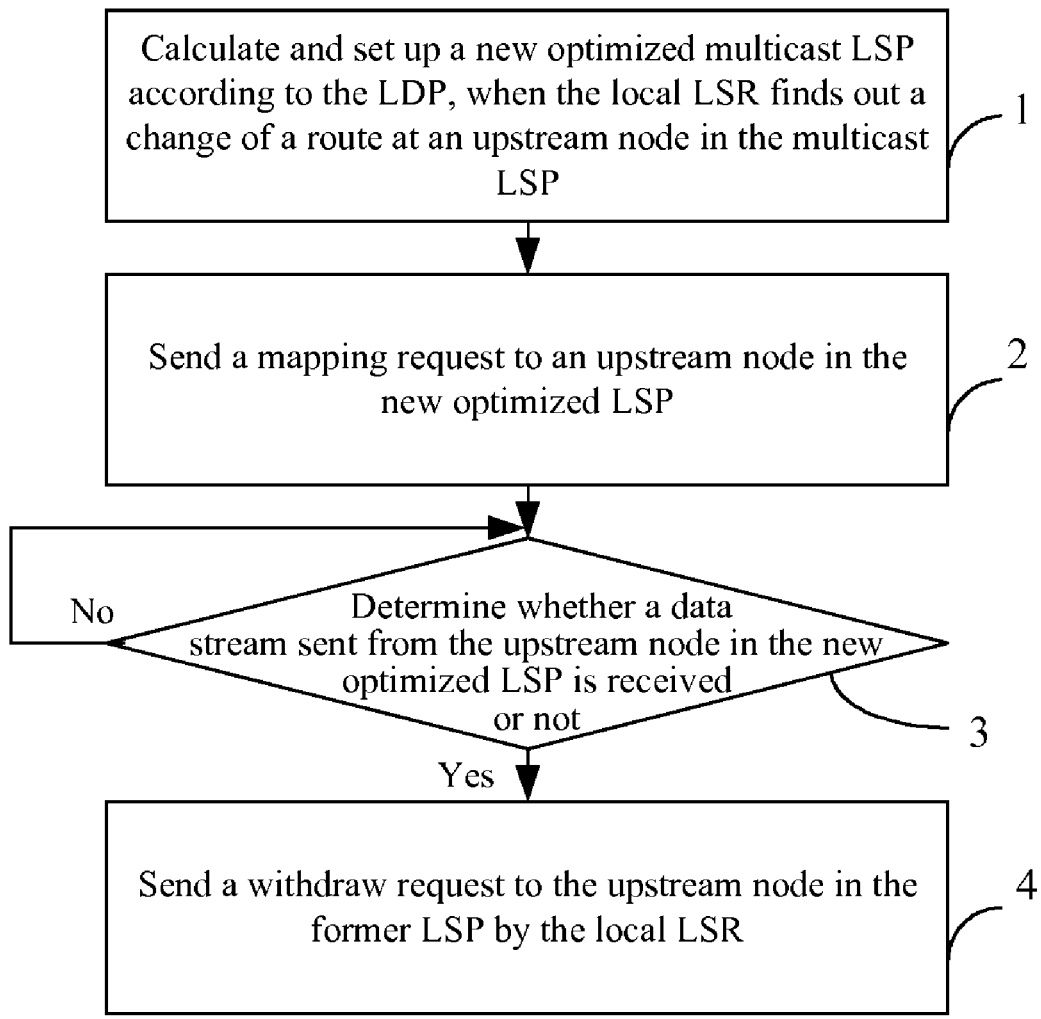
FIG. 2 is a processing flow chart of a first embodiment of the disclosure.

With respect to the method for improving the quality of communication based on a label distribution protocol, a first embodiment of the disclosure is provided, in which once a new optimized multicast LSP is set up, the data stream reaches the local LSP via the new multicast LSP, and then triggers the local LSR to send a withdraw message to the upstream node thereof in the former optimized multicast LSP, so as to withdraw the corresponding unnecessary multicast LSP. As shown in FIG. 2, the detailed implementing procedure includes the following:

At 1, when the local LSR finds out a change of a route at an upstream node in a multicast LSP, it calculates and sets up a new optimized multicast LSP according to the LDP.

At 2, a mapping request is sent to an upstream node in the new optimized multicast LSP.

When an upstream node in the local LSR is an intermediate node, and it is confirmed that a mapping relation is not yet established between the upstream node in the local LSR and the upstream node in the new optimized multicast LSP, the upstream node in the local LSR continues to send the mapping request to an upstream node thereof, until it reaches an ingress node. After the mapping is successfully established, the data stream reaches the local LSR via the new optimized multicast LSP. After receiving the data stream sent from the upstream node in the new optimized multicast LSP, the local LSR sends the withdraw request to the upstream node in the former multicast LSP. The detailed implementing procedures thereof are listed as follows.

At 3, it is determined whether the data stream sent from the upstream node in the new optimized multicast LSP is received or not. If the data stream is received, the process proceeds to 4, that is, the withdraw request is sent to the upstream node in the former optimized multicast LSP; otherwise, the process proceeds to 3.

In the above procedure, when receiving the withdraw request sent from the downstream node, the upstream node first determines whether merely one downstream node thereof exists or not. If merely one downstream node exists, the upstream node directly responds a withdraw request response to the downstream node thereof, and withdraws the multicast LSP between the upstream node and the downstream node thereof. Then, the upstream node determines whether the upstream node itself is an intermediate node or an ingress node. If it is confirmed to be the intermediate node, the upstream node continues to send the withdraw request to the upstream node thereof in the former multicast LSP; and if it is an ingress node, the process ends. Through such processing, the unnecessary link can be withdrawn timely. If not merely one downstream node exists, the upstream node directly responds the withdraw request response to the downstream nodes thereof, withdraws the multicast LSP between the upstream node and the downstream nodes thereof, and ends the operation, without sending the withdraw request to the upstream node thereof.

Figure 3:
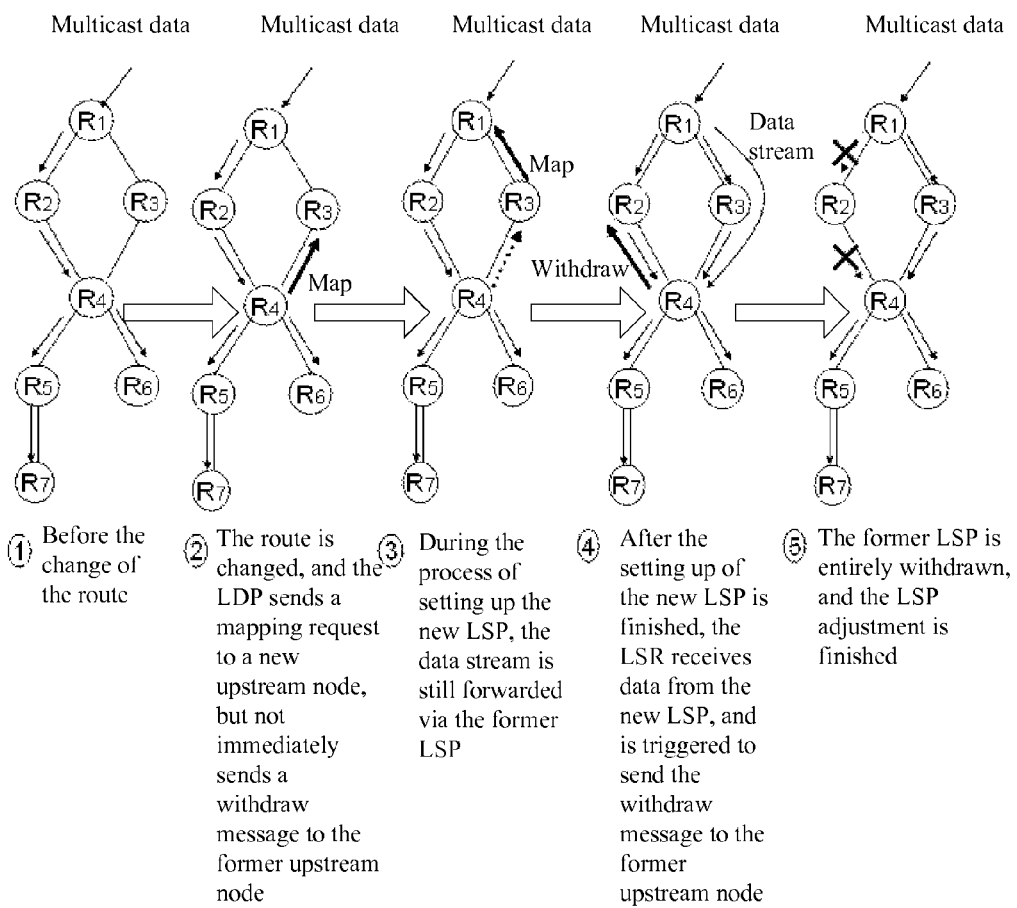
FIG. 3 is a schematic diagram of an operating procedure according to the first embodiment of the disclosure.

The P2MP LSP is taken as an example below to describe the implementing procedures according to a first embodiment of the disclosure, as shown in FIG. 3.

At first, in the P2MP LSP, the data stream is forwarded from the ingress node, for example, the node R1, to the node R4 through the node R2, then from the node R4 to the node R5 and the node R6, and from the node R6 to the node R7. When an LSR, for example, the node R4, finds out the change of the route at the upstream node thereof, the LSR sends the mapping request to the new upstream node R3. Till the setting up of the new optimized P2MP LSP is finished, and the data stream is sent to the node R4 via the new upstream node, the event triggers the node R4 to send the withdraw message to the former upstream node R2, so as to withdraw the unnecessary P2MP LSP. When the former P2MP LSP is entirely withdrawn, the P2MP LSP adjustment procedure is finished.

Figure 4:
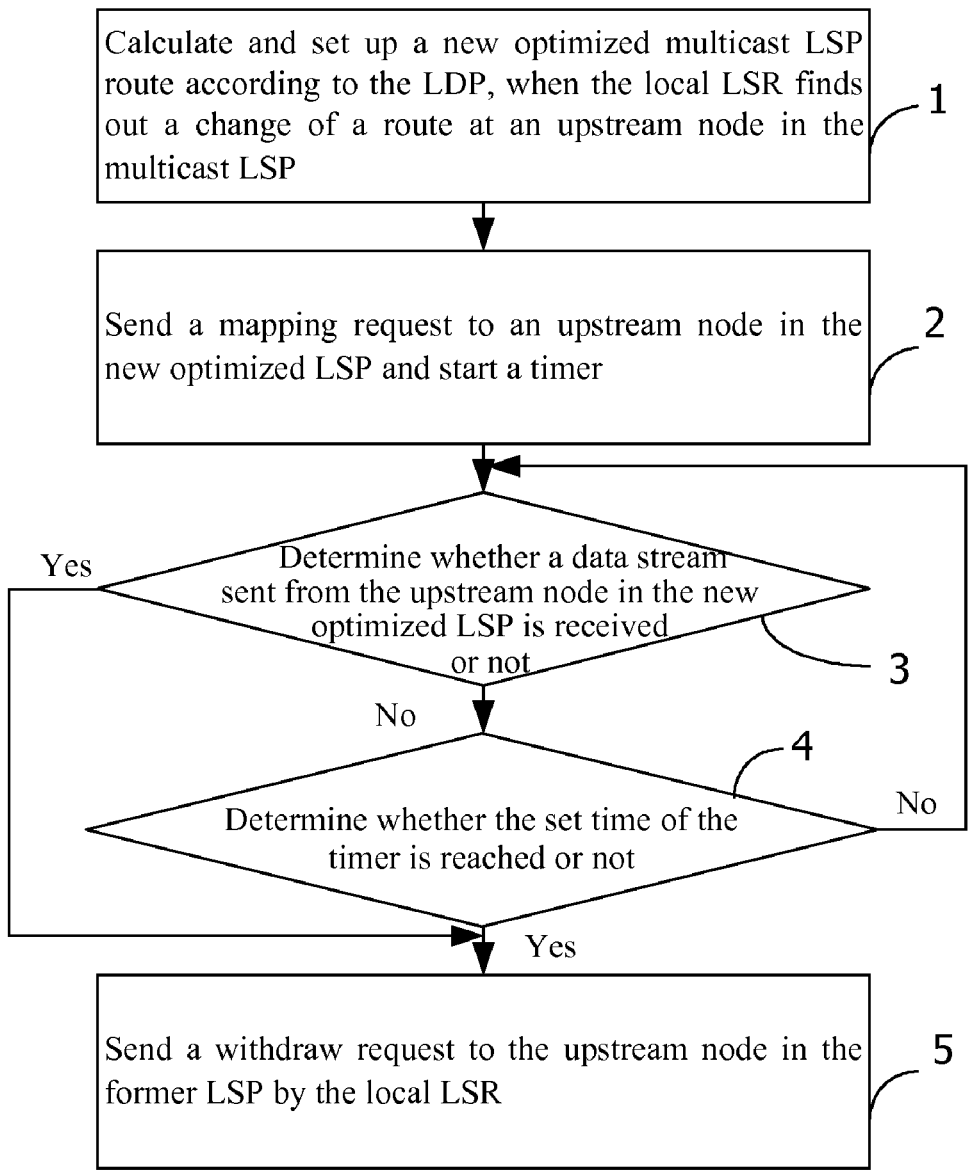
FIG. 4 is a processing flow chart of a second embodiment of the disclosure.

In a practical network, the multicast LSP without data streams may also exist. Thus, in the multicast LSP adjustment procedure, even if the setting up of the new optimized multicast LSP is finished, no data stream can be received from the new optimized multicast LSP. In view of such a situation, a second embodiment of the disclosure is provided. When the mapping massage is sent to the upstream node in the new optimized multicast LSP, a timer is started. If a data stream sent from the upstream node in the new optimized multicast LSP is received before a set time of the timer is reached, the withdraw request is sent to the upstream node in the former optimized multicast LSP. If no data stream is received from the optimized multicast LSP after the set time of the timer is exceeded, the withdraw request is also sent to the upstream node in the former optimized multicast LSP. The processing flow thereof is as shown in FIG. 4.

At 1, when the local LSR finds out the change of the route at the upstream node in the multicast LSP, it calculates and sets up a new optimized multicast LSP according to the LDP.

At 2, the mapping request is sent to the upstream node in the new optimized multicast LSP, and the timer is started.

When the upstream node in the local LSR is the intermediate node, and it is confirmed that the mapping relation is not yet established between the upstream node in the local LSR and an upstream node thereof, the upstream node in the local LSR continues to send the mapping request to the upstream node thereof in the multicast LSP, until it reaches the ingress node. After the mapping is successfully established, the data stream reaches the local LSR via the new optimized multicast LSP. When receiving the data stream sent from the upstream node in the new optimized multicast LSP, the local LSR sends the withdraw request to the upstream node in the former multicast LSP. If the local LSR does not receive any data stream sent from the upstream node in the new optimized multicast LSP when the set time of the timer is reached, the local LSP still sends the withdraw request to the upstream node in the former multicast LSP. The detailed implementing procedures thereof are listed as follows.

At 3, it is determined whether the data stream sent from the upstream node in the new optimized multicast LSP is received or not. If the data stream is received, the process proceeds to 5, that is, the withdraw request is sent to the upstream node in the former optimized multicast LSP; otherwise, the process proceeds to 4.

At 4, it is determined whether the set time of the timer is reached or not. If the set time of the timer is reached, the process proceeds to 5, that is, the withdraw request is sent to the upstream node in the former optimized multicast LSP; otherwise, the process proceeds to 3.

In the above procedure, when receiving the withdraw request sent from the downstream node, the upstream node first determines whether merely one downstream node thereof exists or not. If merely one downstream node exists, the upstream node directly responds a withdraw request response to the downstream node thereof, and withdraws the multicast LSP between the upstream node and the downstream node thereof. Then, the upstream node determines whether the upstream node itself is an intermediate node or an ingress node. If the upstream node is confirmed to be the intermediate node, it continues to send the withdraw request to the upstream node in the former multicast LSP, and if it is an ingress node, the process ends. If not merely one downstream node thereof exists, the upstream node directly responds the withdraw request response to the downstream nodes thereof, withdraws the multicast LSP between the upstream node and the downstream nodes thereof, and ends the operation, without sending the withdraw request to the upstream node thereof.

In a third embodiment of the disclosure, a method for controlling the local LSR node to delay to send the withdraw request to the upstream node in the former optimized LSP merely through using the timer is described, and the implementing procedures thereof are listed as follows.

First, when the local LSR finds out the change of the route at the upstream node in the multicast LSP, it calculates and sets up the new optimized multicast LSP according to the LDP. Then, the mapping request is sent to the upstream node in the new optimized multicast LSP, and the timer is started. When it is confirmed that a set threshold of the timer is reached, the withdraw request is sent to the upstream node in the former optimized multicast LSP.

The multicast LSP in the above embodiment may be a P2MP LSP, and may also be an MP2MP LSP.

Figure 5:
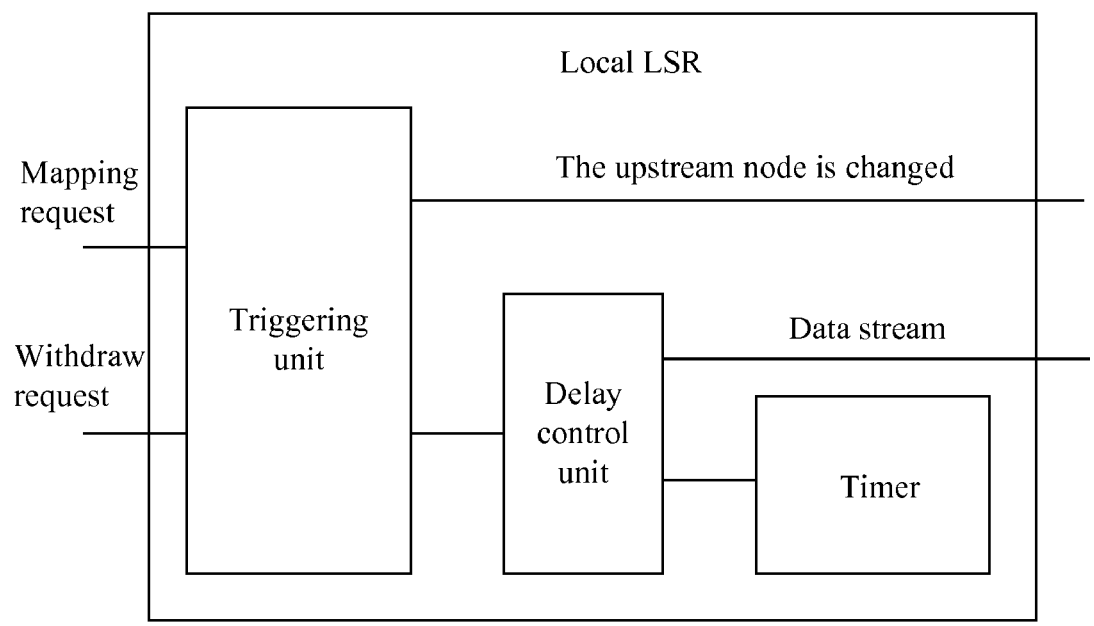
FIG. 5 is a schematic structural diagram of a system according to an embodiment of the disclosure.

In a fourth embodiment of the disclosure, an implementation solution of a system is described. As shown in FIG. 5, the system includes a label switching router (LSR), and the LSR includes a triggering unit, a timer, a delay control unit, and a withdraw request sending unit.

The triggering unit is adapted to trigger the LSR node to send the mapping request to the upstream node in the new optimized LSP, and send the withdraw request to the upstream node in the former multicast LSP.

The timer is adapted to begin to count time once the setting up of the new optimized multicast LSP is finished, and provide the time information to the delay control unit in response to reaching the set threshold.

The delay control unit is adapted to control the triggering unit to send the withdraw request to the upstream node in the former multicast LSP according to a triggering result of the triggering unit and/or the delay information provided by the timer.

Because the delay control unit controls the triggering unit to send the withdraw request to the upstream node in the former multicast LSP according to the triggering result of the triggering unit and/or the delay information, it can delay and control the triggering unit to send the withdraw request to the upstream node in the former multicast LSP.

In an embodiment of the disclosure, the delay control unit further includes a first data stream triggering unit, adapted to control, after receiving a data stream sent from the upstream node in the new optimized multicast LSP, the triggering unit to send the withdraw request to the upstream node in the former multicast LSP.

In an embodiment of the disclosure, the delay control unit further includes a second data stream triggering unit.

The second data stream triggering unit is adapted to control the triggering unit to send the withdraw request to the upstream node in the former multicast LSP in a manner of working together with the timer. The detailed working manner lies in that, after the timer is started, the second data stream triggering unit waits for the data stream sent from the upstream node in the new optimized multicast LSP to trigger to send the withdraw request to the upstream node in the former multicast LSP, and directly sends the withdraw request to the upstream node in the former multicast LSP when no data stream is sent from the upstream node in the new optimized multicast LSP after the set threshold of the timer is exceeded.

It can be known from the detailed implementing procedures of the embodiments that, since the local LSR sends the mapping request to the upstream node in the new optimized LSP, the withdraw request is not immediately sent to the former upstream node during the process of reconstructing the new multicast LSP, and thus, the former multicast LSP is maintained during a certain time period, and the data stream is continuously forwarded via the former multicast LSP. It can be known that, through the disclosure, the interruption of the data stream in the multicast LSP reconstruction procedures can be avoided or reduced, so that the losing of data packets caused by the multicast LSP adjustment is reduced greatly, and the quality of communication of the multicast is improved.

The aforementioned embodiments are merely preferred embodiments of the disclosure. It will be apparent to those skilled in the art that various modifications and variations can be made to the disclosure without departing from the scope or spirit of the disclosure. In view of the foregoing, it is intended that the disclosure cover modifications and variations provided that they fall within the scope of the following claims and their equivalents.

What is claimed is:

1. A method for improving the quality of communication based on a label distribution protocol, comprising:
    calculating and setting up, by a local label switching router (LSR), a new optimized multicast label switching path (LSP) according to the label distribution protocol (LDP),
    sending a mapping request to an upstream node in the new optimized multicast LSP and starting a timer;
    determining whether a data stream sent from the upstream node in the new optimized multicast LSP is received or not; if the data stream is received, sending a withdraw request to the upstream node in a former optimized multicast LSP; and
    if the data stream sent from the upstream node in the new optimized multicast LSP is not received, when it is confirmed that the set threshold of the timer is reached, sending a withdraw request to the upstream node in the former optimized multicast LSP.

2. The method according to claim 1, wherein the sending a mapping request to an upstream node in the new optimized multicast LSP further comprises:
    continuing to send, by the upstream node in the local LSR, a mapping request to an upstream node thereof, when the upstream node in the local LSR is an intermediate node and it is confirmed that a mapping relation is not yet established between the upstream node in the local LSR and the upstream node thereof in the multicast LSP.

3. A method for improving the quality of communication based on a label distribution protocol, comprising:
    calculating and setting up, by a local label switching router (LSR), a new optimized multicast label switching path (LSP) according to the label distribution protocol (LDP), and delaying to send a withdraw request to an upstream node in a former multicast LSP, when the local LSR finds out a change of the upstream node in the multicast LSP, wherein after sending the withdraw request to the upstream node in the former optimized multicast LSP, the method further comprises:
    determining, by the upstream node in the former multicast LSP receiving the withdraw request, whether merely one downstream node thereof exists or not; if merely one downstream node exists, responding a withdraw request response to the downstream node thereof and withdrawing the multicast LSP between the upstream node and the downstream node thereof; determining, by the upstream node in the former multicast LSP receiving the withdraw request, whether the upstream node itself is an intermediate node or an ingress node; if it is an intermediate node, continuing to send the withdraw request to an upstream node in the former multicast LSP and then turning to the determining whether merely one downstream node thereof exists or not, and if it is an ingress node, ending the step; and
    if the upstream node in the former multicast LSP receiving the withdraw request determines that not merely one downstream node thereof exists, responding the withdraw request response to the downstream nodes thereof, withdrawing the multicast LSP between the upstream node and the downstream nodes thereof, and ending the operation.

4. The method according to claim 1, wherein the multicast LSP further comprises:
    a point-to-multipoint LSP (P2MP LSP) or a multipoint-to-multipoint LSP (MP2MP LSP).

5. A system for improving the quality of communication based on a label distribution protocol, comprising a label switching router (LSR), wherein the LSR comprises:
    a triggering unit, configured to trigger an LSR node to send a mapping request to an upstream node in a new optimized label switching path (LSP), and send a withdraw request to an upstream node in a former multicast LSP;
    a timer, configured to begin to count time once the setting up of the new optimized multicast LSP is finished, and provide time information to for delay control after a set threshold is reached;
    a delay control unit, configured to control the triggering unit to send a withdraw request to the upstream node in the former multicast LSP,
    wherein the delay control unit further comprises:
    a data stream triggering unit, configured to control the triggering unit to trigger to send a withdraw request to the upstream node in the former multicast LSP, once it is confirmed that a data stream sent from the upstream node in the new optimized multicast LSP is received; and
    directly send a withdraw request to the upstream node in the former multicast LSP, once it is confirmed that no data stream sent from the upstream node in the new optimized multicast LSP is received when the set threshold of the timer is exceeded.

* * * * *